(No Model.)

S. M. CORWIN.
MACHINE FOR REMOVING STAR FISH FROM OYSTER BEDS.

No. 436,935. Patented Sept. 23, 1890.

Attest:
A. N. Jesbera
E. M. Watson

Inventor:
Seth M. Corwin
By David A. Burr
Atty.

UNITED STATES PATENT OFFICE.

SETH M. CORWIN, OF GREENPORT, NEW YORK.

MACHINE FOR REMOVING STAR-FISH FROM OYSTER-BEDS.

SPECIFICATION forming part of Letters Patent No. 436,935, dated September 23, 1890.

Application filed September 16, 1889. Serial No. 324,060. (No model.)

*To all whom it may concern:*

Be it known that I, SETH M. CORWIN, of Greenport, in the county of Suffolk and State of New York, have invented a new and useful Machine for Removing Star-Fish from Oyster-Beds and other Submarine Locations; and I do hereby declare that the following is a full and exact description thereof, reference being had to the accompanying drawings, and to the letters of reference marked thereon, making a part of this specification.

This invention relates to apparatus for detaching and removing star-fish from oyster-beds, and has for its object to remove the star-fish without disturbing the oysters.

It consists in a drum or roller armed with rows of sharp radial spikes, which are preferably provided with clearing-bars reciprocating radially upon each row, and having suitable connections by which it may be drawn to revolve over the oyster-beds or other submarine bottoms and thereby spear the star-fish resting thereon, and in the combination, with this spiked self-clearing roller, of a suitable receptacle to catch and retain the fish removed from the spikes by the clearing-bars, all substantially as hereinafter described and claimed.

Figure 1:
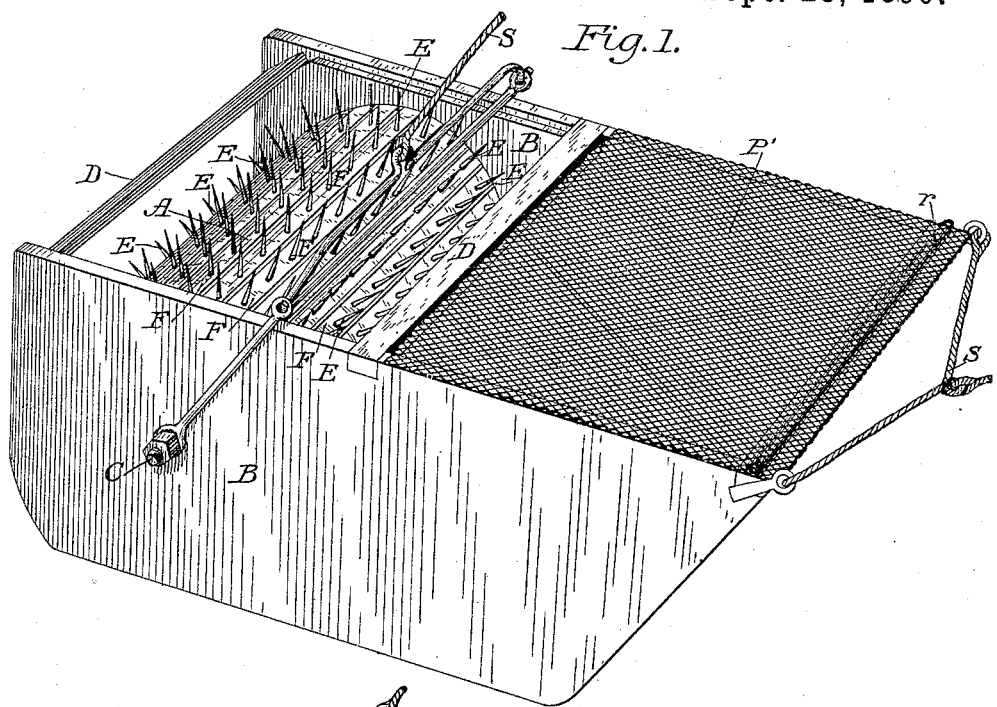
Figure 2:
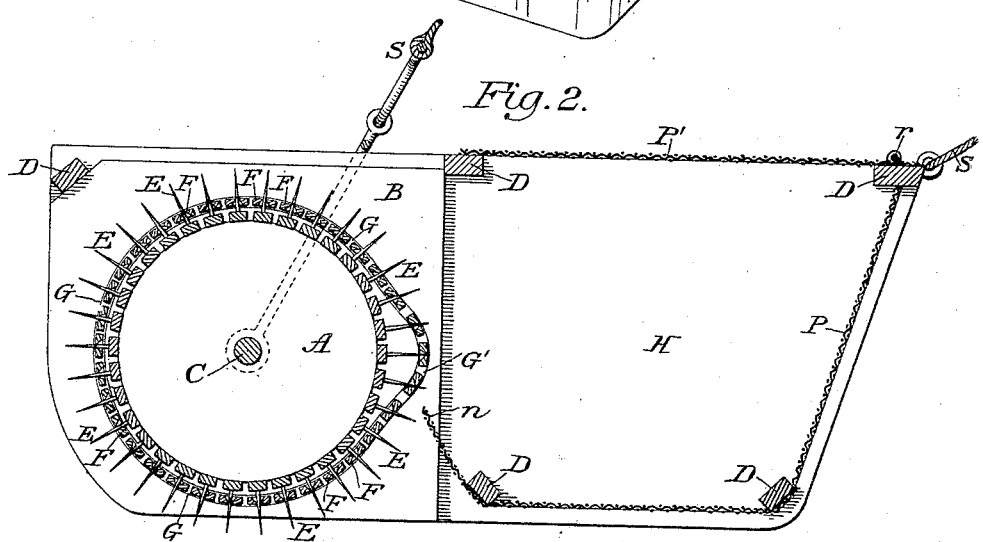
Figure 3:
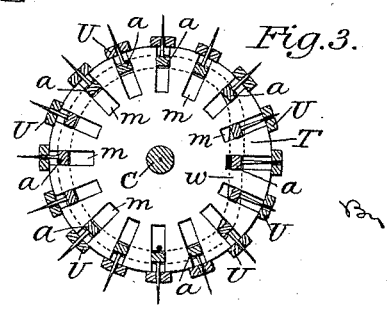

In the accompanying drawings, Figure 1 is a view in perspective of the machine complete; Fig. 2, a vertical central section transverse to the axis of the roller, and Fig. 3 a sectional view illustrating a modification in the device for clearing the spikes.

A represents the spearing-roller in my machine. It consists of a drum or cylindrical frame of large diameter, so that it may be rolled easily over the oyster-beds, and which is mounted upon suitable journals C to revolve between the two side plates or heads B B of the machine, which are connected by suitable rods D D to form a carriage or supporting-frame therefor.

The periphery of the roller A is studded with long sharp-pointed spikes E E E, which are fixed thereto to project radially therefrom in close parallel rows extending the length of the roller. A movable clearing-bar F is fitted upon each row to extend its length, and the spikes are severally made to pass through apertures in the bar, so that the latter may play freely in and out upon the spikes between the periphery of the roller and their points. The ends of these clearing-bars project beyond the ends of the roller and slide freely in guideways or grooves G, (see Fig. 2,) formed or fitted on the inner face of each head of the machine to follow a circular path of a diameter slightly greater than that of the roller and concentric therewith, excepting at the front, where the grooves are curved outwardly to form an eccentric loop G'. Hence the clearing-bars will in the revolution of the roller remain against the periphery of the drum, so that the sharp spikes may project outwardly free and clear until they approach the front, whereupon as the ends of the bars move into the loop G', formed by the grooves, the bars will be carried in succession radially to the outer ends of the spikes, thereby stripping them, and as the spikes pass downward will be drawn in again thereon to their normal position.

A basket or receptacle H for the fish is attached to the front of the machine. It may consist of a light slatted box, but preferably is constructed of a netting P, of wire or other suitable material, stretched over the frame or bars connecting the front ends of the two side plates B B, which are extended forward for the purpose. The portion of the basket H next to the roller is left open, its lower edge *n* being bent up into close proximity to the ends of the revolving spikes below the point at which they are stripped by the clearing-bars. Sufficient space is left between the cover of the basket and the proximate ends of the spikes to permit the star-fish impaled thereon to be carried down into the basket. The ends of the basket H are closed by the side plates B B, and the top thereof is provided with a cover P', which may be hinged, as at *r*, to permit of readily emptying it.

The machine is dragged over the oyster-beds by means of chains or ropes S S or other fitting appliance attached to the upper front bar of the basket and to the axle of the machine.

In the use of the machine it is drawn over the oyster-beds or submarine bottoms upon which the star-fish are found, and in its movement the spikes E E E, projecting from the roller, will pierce the star-fish and carry them impaled thereon up over the roller to the mouth of the basket, where by the automatic radial movement of the clearing-bars F F F the fish will be pushed off the spikes and allowed to drop in the basket, while the cleared spikes will move forward in readiness to impale the fish over which they are next carried. The engagement of the spikes with the bed over which the machine is drawn will produce automatically the rotation of the roller, and the forward movement of the ends of the clearing-bars in the stationary grooves G, formed in the heads in which the roller is journaled, will cause their outward movement in the loops G' of the grooves, so as to strip the spikes as they cross the mouth of the basket. By this means the star-fish are picked up and thrown into the basket without any disturbance of the bottom or of the oysters. So soon as the basket is filled the machine is drawn to the surface and the contents emptied.

I contemplate fixing the spikes upon movable bars $a\,a$, (see Fig. 3,) whose ends project through radial slots $m\,m$ in disks T at each end of the shaft of the roller into stationary grooves formed in the heads of the machine. These grooves (see dotted lines, Fig. 3) follow a circular path concentric with the axle C, excepting at a point opposite the basket, where the grooves will be straightened, as shown at $w$, so as to carry the spikes toward the axis, the spikes being made to project through fixed slats U U, which are secured at their ends to the circular disks T T or radial brackets carried by the roller to revolve therewith, so that as the projecting spikes reach the basket they will be drawn inward through the fixed bars, and be thereby cleared of the impaled fish.

I claim as my invention—

1. A machine for catching star-fish, which consists of a revolving cylinder having radially-projecting spikes thereon, a basket, and means for disengaging the star-fish from said spikes and projecting them into the basket, substantially in the manner and for the purpose herein set forth.

2. A machine for catching star-fish, which consists of a roller provided with radial spikes, a carriage or supporting-frame connected to the axle and containing a basket, a draw-bar pivoted to the axle, and draft-ropes attached to said draw-bar and to the carriage, substantially in the manner and for the purpose herein set forth.

3. The combination, in an apparatus for destroying star-fish, of a roller, radial spikes upon its periphery, radially-moving clearing-bars through which the spikes project, and means, substantially as described, by which the bars are made to reciprocate to and from the roller, substantially in the manner and for the purpose herein set forth.

4. The combination, in an apparatus for destroying star-fish, of a roller, devices for drawing the same, radial spikes upon its periphery, radially-moving clearing-bars through which the spikes project, means, substantially as described, for guiding the clearing-bars in the revolution of the roller and by which they are made to reciprocate to and from the roller, and a receptacle adapted to receive the fish stripped from the spikes by the movement of the clearing-bars, substantially in the manner and for the purpose herein set forth.

In testimony whereof I have signed my name to this specification in the presence of two subscribing witnesses.

SETH M. CORWIN.

Witnesses:
FANNIE P. HEDGES,
CHAS. H. TUTHILL.